US010275071B2

(12) United States Patent
Zhou et al.

(10) Patent No.: US 10,275,071 B2
(45) Date of Patent: Apr. 30, 2019

(54) TOUCH DISPLAY DEVICE, TOUCH DISPLAY PANEL AND ARRAY SUBSTRATE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Xingyao Zhou, Shanghai (CN); Huiping Chai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 53 days.

(21) Appl. No.: 15/173,941

(22) Filed: Jun. 6, 2016

(65) Prior Publication Data
US 2017/0185210 A1    Jun. 29, 2017

(30) Foreign Application Priority Data
Dec. 28, 2015   (CN) .......................... 2015 1 1000550

(51) Int. Cl.
*G06F 3/041*    (2006.01)
*G06F 3/044*    (2006.01)
(52) U.S. Cl.
CPC ............ *G06F 3/0416* (2013.01); *G06F 3/044* (2013.01); *G06F 3/0412* (2013.01); *G06F 2203/04111* (2013.01)

(58) Field of Classification Search
CPC ....... G06F 3/0416; G06F 3/0412; G06F 3/044
See application file for complete search history.

(56) References Cited

U.S. PATENT DOCUMENTS 9,024,913 B1 *   5/2015   Jung ....................... G06F 3/044
                                                                   345/174
9,218,085 B2 *  12/2015   Hwang ................. G06F 3/044
9,619,066 B2 *   4/2017   Gwon ..................... G06F 3/044
(Continued)

FOREIGN PATENT DOCUMENTS

CN         104503648 A      4/2015
CN         104503650 A      4/2015
CN         104699351 A      6/2015

*Primary Examiner* — Nitin Patel
*Assistant Examiner* — Robert M Stone
(74) *Attorney, Agent, or Firm* — Kilpatrick Townsend & Stockton, LLP (57) ABSTRACT

The present disclosure provides a touch display device, a touch display panel and an array substrate. The array substrate includes a substrate; a plurality of pixel units disposed on the substrate, columns of touch electrodes, a driving circuit for driving the touch electrodes, touch lines connected to a corresponding touch electrode through a first via hole for connecting the corresponding touch electrode to the driving circuit, and at least one auxiliary line positioned between two adjacent touch lines. Each touch electrode covers a plurality of pixel units. Each auxiliary line is connected through a third via hole to a touch electrode at the third via hole and broken between adjacent touch electrodes, wherein for each column of touch electrodes, auxiliary via holes are disposed on the touch electrodes.

17 Claims, 7 Drawing Sheets

(56) References Cited

U.S. PATENT DOCUMENTS

| | | | | |
|---|---|---|---|---|
| 2011/0157039 A1* | 6/2011 | Shin | ............... | G02F 1/13338 345/173 |
| 2012/0218199 A1* | 8/2012 | Kim | ............... | G06F 3/0412 345/173 |
| 2013/0257794 A1* | 10/2013 | Lee | ............... | G06F 3/041 345/174 |
| 2014/0118277 A1* | 5/2014 | Kim | ............... | G06F 3/044 345/173 |
| 2015/0091014 A1* | 4/2015 | Hong | ............... | H01L 27/124 257/72 |
| 2016/0026291 A1* | 1/2016 | Zhao | ............... | G06F 3/044 345/174 |
| 2016/0209951 A1* | 7/2016 | Liu | ............... | G06F 3/044 |
| 2016/0327834 A1* | 11/2016 | Yu | ............... | G02F 1/134363 |
| 2016/0349899 A1* | 12/2016 | Hwang | ............... | G06F 3/0416 |

\* cited by examiner

TOUCH DISPLAY DEVICE, TOUCH DISPLAY PANEL AND ARRAY SUBSTRATE

CROSS REFERENCE

This application is based upon and claims priority to Chinese Patent Application No. 201511000550.4, filed on Dec. 28, 2015, the entire contents thereof are incorporated herein by reference.

TECHNICAL FIELD

The present disclosure relates to the field of touch display, and more particularly, to a touch display device, a touch display panel and an array substrate.

BACKGROUND

With the development of human-computer interaction technology, touch technology is increasingly used in a variety of displays. Capacitive touch technology is widely used due to its advantages of wear resistance, long service life, low maintenance cost for user, and capability of supporting gesture recognition and multi-touch.

Capacitive touch technology can be divided into self-capacitance touch technology and mutual capacitance touch technology depending on the detection method of capacitance between objects. Through the self-capacitance touch technology, presence, location and movement of an input object on a touch screen is detected according to change in capacitance between an electrode and the ground caused by the input object. Through the mutual capacitance touch technology, presence, location and movement of an input object on a touch screen is detected according to change in capacitance between electrodes caused by the input object. Compared with the mutual capacitance touch technology, the self-capacitance touch technology has advantages such as low cost, high report rate and excellent hovering characteristic.

In addition, depending on the location of the touch panel in the display device, touch display devices can also be divided into in-cell touch display devices, on-cell touch display devices and out hanging touch display devices. The in-cell touch display device has become an important research direction of the touch technology due to its advantages of high integration, low profile and superior performance, etc.

Figure 1:
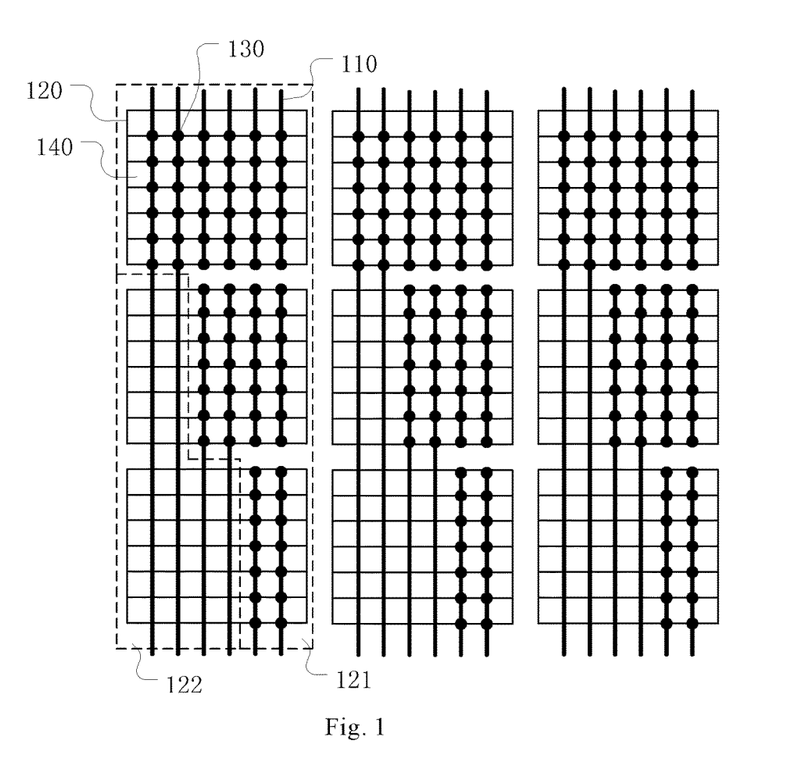
FIG. 1 is a schematic diagram of an array substrate with broken touch line according to the prior art.

In the in-cell self-capacitance touch technology of the prior at, for example, a common electrode layer on an array substrate is reused as a touch electrode, and the touch electrode is connected to a driving circuit of the array substrate by a touch line. In order to reduce the load of the array substrate, generally a touch line which is broken into segments is used to connect the touch electrode and the driving circuit of the array substrate. However, as shown in FIG. 1, since the touch line 110 is of a broken type, via holes 130 are provided in the region 121 of the touch electrodes 120, and no via hole is provided in another region 122. Then, there is a large difference in the amount of via holes between the region 121 and the region 122. This causes the via holes 130 unevenly distributed on the touch electrodes 120, and brings about problems such as unevenness and visible mura in the displayed images.

SUMMARY

To overcome the problems in the prior art, the objective of the present disclosure is to provide a touch display device, a touch display panel and an array substrate, to solve the problem of unevenness and visible mura in the displayed images in the prior art.

According to one aspect of the present disclosure, there is provided an array substrate, which includes a substrate; a plurality of pixel units disposed on the substrate. And columns of touch electrodes. Each column of touch electrodes includes an X number of touch electrodes, and each touch electrode covers a plurality of pixel units. The array substrate can also include a driving circuit for driving the touch electrodes and touch lines connected to a corresponding touch electrode through a first via hole for connecting the corresponding touch electrode to the driving circuit. The array substrate can still include at least one auxiliary line positioned between two adjacent touch lines. Each auxiliary line is connected through a third via hole to a touch electrode at the third via hole and broken between adjacent touch electrodes, wherein for each column of touch electrodes. For a touch line that passes through a first touch electrode to a $p^{th}$ touch electrode and corresponds to the $p^{th}$ touch electrode, the touch line is broken into segments between any two adjacent touch electrodes of the $p^{th}$ touch electrode to the $X^{th}$ touch electrode, and is provided with second via holes respectively on the $(p+1)^{th}$ touch electrode to the $X^{th}$ touch electrode, such that each segment of touch line is connected through a second via hole to a touch electrode at the second via hole. For each column of touch electrodes, auxiliary via holes are disposed respectively on the first touch electrode to the $(p-1)^{th}$ touch electrode, such that an auxiliary line next to a touch line corresponding to a $p^{th}$ touch electrode is connected through an auxiliary via hole to a touch electrode at the auxiliary via hole, X is an integer larger than or equal to 2, and when X is larger than 2, p is an integer between 2 and (X−1).

According to another aspect of the present disclosure, there is provided a touch display panel including the array substrate described above.

According to another aspect of the present disclosure, there is provided a touch display device including the touch display panel described above.

Compared with the prior art, the present disclosure can solve the problem of unevenness and visible mura in the displayed images, and have the following advantages.

1) By providing auxiliary lines, and for each touch control line, providing auxiliary via holes of an auxiliary lines next to the touch control line on touch electrodes on which the touch lines have no first via holes or second via holes, the difference in numbers of via holes among the different regions of the touch electrodes can be reduced, and the problem of uneven via holes on the touch electrodes can be solved.

2) By spacing apart the first via holes, the second via holes and the third via holes with more than one pixel units, the number of via holes on the array substrate can be reduced.

3) By evenly distributing the locations of the first via holes, the second via holes and the third via holes, and disposing the locations of the auxiliary via holes based on the locations of the first via holes on the touch electrodes, the via holes on the touch electrodes can be distributed substantially evenly.

BRIEF DESCRIPTION OF THE DRAWINGS

The above and other features and advantages of the present disclosure will become more apparent from the detailed description of exemplary embodiments with reference to the following accompanying drawings.

DETAILED DESCRIPTION

Exemplary embodiments will now be more fully described with reference to the accompanying drawings. However, the exemplary embodiments can be implemented in various forms, and should not be understood as limited to the embodiments set forth herein. On the contrary, these embodiments are provided to make the present disclosure thorough and complete, and to fully convey the concept of the exemplary embodiments to those skilled in the art. Similar numeral reference denotes similar or same parts throughout the accompanying drawings, and repeat description thereof will be omitted.

In addition, the features, structures or characteristics described herein can be combined in one or more embodiments in any appropriate way. In the description herein, many specific details are provided for fully understanding of the embodiments of the present disclosure. However, it will be appreciated by those skilled in the art that the technical solution of the present disclosure can be practiced without one or more of the specific details, or with other methods, components, materials etc. In addition, known structures, materials or operations will not be illustrated or described in detail, to avoid obscuration of the present disclosure.

The accompanying drawings are merely for illustration of the relative positions, thicknesses of layers of some parts are drawn as exaggerated for easy understanding, and the thicknesses of the layers in the accompanying drawings do not represent the proportional relationship between the actual layers.

Figure 2A:
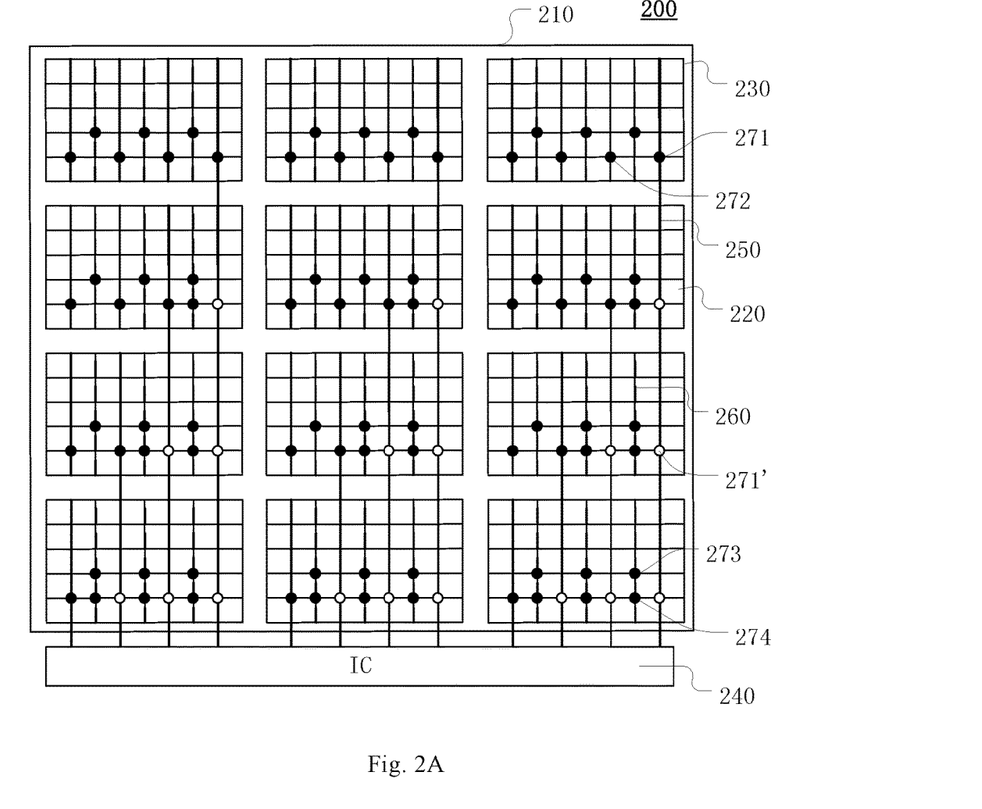
FIG. 2A is a schematic diagram of an array substrate according to an embodiment of the present disclosure.
Figure 2B:
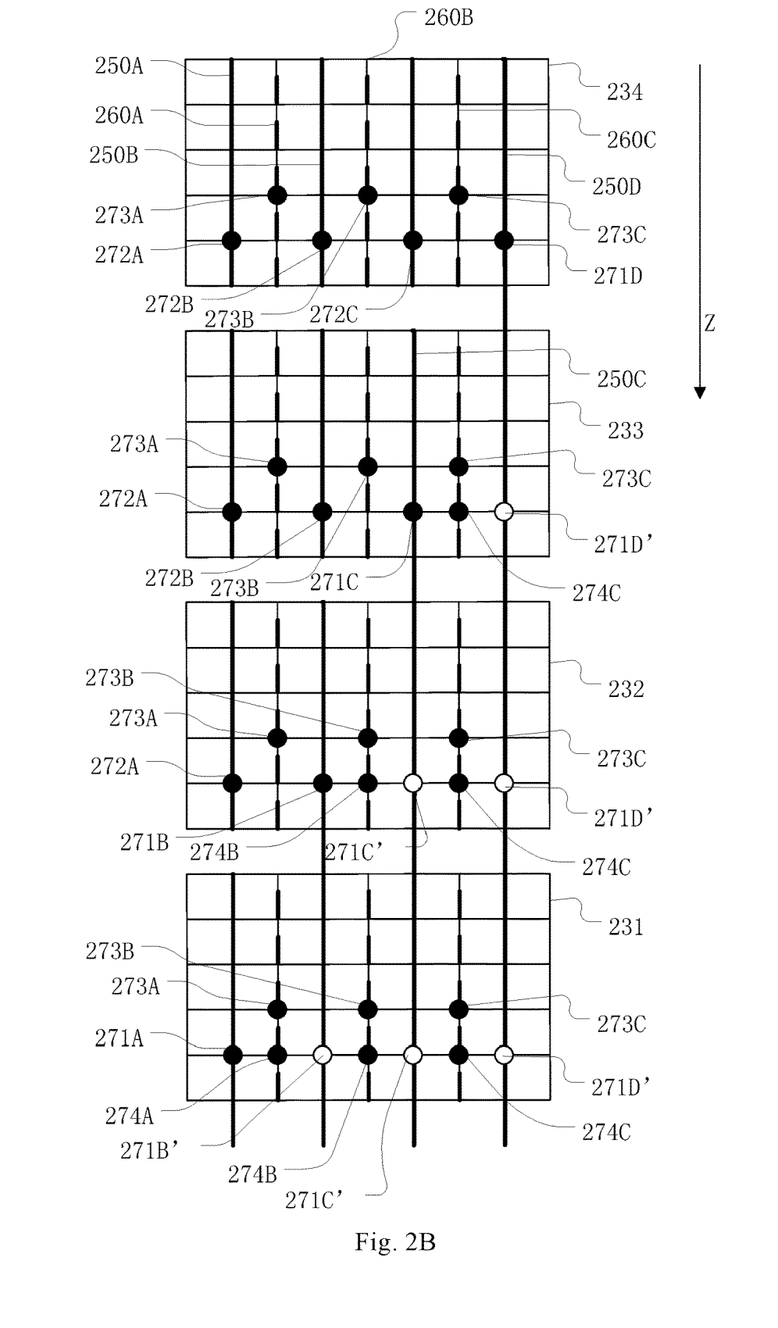
FIG. 2B is a schematic diagram of a column of touch electrodes in the embodiment of FIG. 2A.

In order to overcome the display problem in the prior art, the present disclosure provides an array substrate 200. Referring to FIGS. 2A and 2B, the array substrate 200 includes a substrate 210, pixel units 220, touch electrodes 230 obtained by dividing a common electrode layer, a driving circuit 240, touch lines 250 and at least one auxiliary line 260.

The pixel units 220 are disposed on the substrate 210, preferably, in a form of a matrix. Each of the pixel units 220 can include three sub-pixels RGB. In some modified embodiments, each of the pixel units 220 can include four sub-pixels RGBW. The pixel units 220 can emit light and display corresponding colors based on a display and light emitting technology such as LCD technology, LED technology or OLED technology.

The touch electrodes 230, which are obtained by dividing a common electrode layer, form a touch electrode array on the substrate 210. The touch electrode array includes columns of touch electrodes. Each of the columns contains a number of touch electrodes 230 depending on the size and shape of the array substrate and the desired touch sensing region. For example, when the array substrate 200 has a rectangular shape, the number of touch electrodes 230 contained in each of the columns may be the same. For another example, when the desired touch sensing region has an irregular shape, the number of touch electrodes 230 contained in each of the columns may be different from each other. In the present embodiment, the touch electrodes 230 are illustrated as in rectangular shapes, for example. In other embodiments, the touch electrodes 230 can be of other shapes. In the present embodiment, the touch electrodes 230 on one array substrate 200 can have the same size and shape. In other embodiments, the touch electrodes 230 on one array substrate 200 can have different sizes and shapes. Specifically, since the common electrode layer of the array substrate 200 is reused as touch electrodes 230, and each of the pixel units 220 has a relatively small size, each of the touch electrodes 230 covers more than one pixel units 220, in consideration of the accuracy and precision of the touch sensing, the response speed of the driving circuit and the production process of the array substrate 200.

The driving circuit 240 is configured to drive the touch electrodes 230, and sense an input object in a sensing region formed by the touch electrodes 230.

Each touch line 250 is connected to a corresponding touch electrode 230 through a first via hole 271, and connects the corresponding touch electrode 230 to the driving circuit 240. In other words, each touch line 250 corresponds to one touch electrode 230. Preferably, the touch line 250, which is broken into segments, is connected to the touch electrode 230. Each column of touch electrodes contains a first touch electrode 230, a second touch electrode 230 . . . and an $X^{th}$ touch electrode 230 from up to down. When a touch line 250 passes through the first touch electrode 230 to a $p^{th}$ touch electrode 230, and corresponds to the $p^{th}$ touch electrode 230, the touch line 250 is connected to the $p^{th}$ touch electrode 230 through a first via hole 271. At this time, the touch line 250 is discontinuous on the $(p+1)^{th}$ touch electrode 230 to the $X^{th}$ touch electrode 230. That is, the touch line 250 is split to segments of touch lines on the $(p+1)^{th}$ touch electrode 230 to the $X^{th}$ touch electrode 230. For example, each touch electrode 230 corresponds to one segment of touch line, and a second via hole 272 is provided for each of the $(p+1)^{th}$ touch electrode 230 to the $X^{th}$ touch electrode 230 such that each segment of touch line can be connected through a second via hole 272 to a touch electrode 230 positioned at the second via hole 272. X is an integer larger than or equal to 2, and when X is larger than 2, p is an integer between 2 and (X−1). When the touch line 250 corresponds to the first touch electrode 230, the touch line 250 is divided into discontinuous segments on the second to the $X^{th}$ touch electrodes, and second via holes 272 are provided on the second to the $X^{th}$ touch electrodes 230 such that each segment of touch line 250 is connected through a second via hole 272 to a touch electrode 230 positioned at the second via hole 272. When the touch line 250 corresponds to the $X^{th}$ touch electrode 230, the touch line 250 passes through the entire column of touch electrodes. When X is equal to 2, and if the touch line 250 corresponds to the first touch electrode 230, the touch line 250 is broken between the two touch electrodes 230; and if the touch line 250 corresponds to the second touch electrode 230, the touch line 250 passes through the two touch electrodes 230.

To describe the connection between the touch line 250 and the touch electrodes 230 in detail, referring to the first column of touch electrodes shown in FIG. 2B, for example, the first column of touch electrodes includes four touch electrodes 230, respectively, the first touch electrode 231, the second touch electrode 232, the third touch electrode 233 and the fourth touch electrode 234 from down to top.

A touch line 250A is connected to the first touch electrode 231 through a first via hole 271a and thus corresponds to the first touch electrode 231. The touch line 250A is broken between every two of the first touch electrode 231 to the fourth touch electrode 234. Second via holes 272A are respectively provided on the second touch electrode 232 to the fourth touch electrode 234 such that each segment of touch line can be connected through one second via hole 272A to a touch electrode (i.e. one of the second touch electrode 232 to the fourth touch electrode 234) positioned at the second via hole 272A.

A touch line 250B passes through the first touch electrode 231 and the second touch electrode 232. The touch line 250B is connected to the second touch electrode 232 through a first via hole 271B and thus corresponds to the second touch electrode 232. The touch line 250B has no via hole on the first touch electrode 231. The touch line 250B is broken between every two of the second touch electrode 232 to the fourth touch electrode 234. Second via holes 272B are respectively provided on the third touch electrode 233 and the fourth touch electrode 234 such that each segment of touch line can be connected through one second via hole 272B to a touch electrode (i.e. one of the third touch electrode 233 and the fourth touch electrode 234) positioned at the second via hole 272B.

A touch line 250C passes through the first touch electrode 231 to the third touch electrode 233. The touch line 250C is connected to the third touch electrode 233 through a first via hole 271C and thus corresponds to the third touch electrode 233. The touch line 250C has no via hole on the first touch electrode 231 and the second touch electrode 232. The touch line 250C is broken between the third touch electrode 233 and the fourth touch electrode 234. A second via hole 272C is provided on the fourth touch electrode 234 such that the segment of touch line corresponding to the fourth touch electrode 234 is connected to the fourth touch electrode 234 through the second via hole 272C.

A touch line 250D passes through the first touch electrode 231 to the fourth touch electrode 234. The touch line 250D is connected to the fourth touch electrode 234 through a first via hole 271D and thus corresponds to the fourth touch electrode 234. The touch line 250D has no via hole on the first touch electrode 231 to the third touch electrode 233.

In the embodiment described and illustrated above, there are four touch electrodes 230. However, the number of each column of touch electrodes is not intended to be limiting. Preferably, the number of each column of touch electrodes is larger than 2, such as 3, 5 or more.

In order to evenly distribute the via holes on the touch electrodes 230, the auxiliary lines 260 are provided on the substrates 210, which will be described with reference to FIGS. 2A and 2B. An auxiliary line 260 is disposed between two touch lines 250, extending in parallel with the touch lines 250. Specifically, the auxiliary line 260 can be disposed between any two of the touch lines 250 for one column of touch electrodes (for example, at one or more of the following locations: between the touch line 250A and the touch line 250B, between the touch line 250B and the touch line 250C, and between the touch line 250C and the touch line 250D). In the embodiment shown in FIG. 2A, for each column of touch electrodes, one auxiliary line 260 is disposed between every two adjacent touch lines 250, and the auxiliary line 260 is broken between the adjacent touch electrodes 230. That is, the auxiliary line 260 is divided into segments of lines. For example, each touch electrode 230 can correspond to a segment of the auxiliary line 260. For example, as shown in FIG. 2B, the auxiliary line 260 is broken between every two of the first touch electrode 231, the second touch electrode 232, the third touch electrode 233 and the fourth touch electrode 234. The auxiliary line 260 is connected through a third via hole 273 to a touch electrode 230 positioned at the third via hole 273. Preferably, in the present embodiment, the auxiliary line 260 is connected through third via holes 273 to the touch electrodes 230.

In the present disclosure, auxiliary via holes 274 are provided on the auxiliary lines 260 to reduce the difference in the number of via holes among the regions of the touch electrodes 230. Specifically, for each column of touch electrodes, auxiliary via holes 274 are provided on the first to the $(p-1)^{th}$ touch electrodes 230, such that an auxiliary line 260 next to a touch line 250 corresponding to the $p^{th}$ touch electrode 230 can be connected through an auxiliary via hole 274 to a touch electrode positioned at the auxiliary via hole 274. For the touch line 250 corresponding to the $X^{th}$ touch electrode 230, auxiliary via holes are provided on the first to the $(X-1)^{th}$ touch electrodes 230, such that the auxiliary line 260 next to the touch line 250 corresponding to the $X^{th}$ touch electrode 230 can be connected through an auxiliary via hole 274 to a touch electrode 230 positioned at the auxiliary via holes 274.

Preferably, on each of the first to the $(p-1)^{th}$ touch electrodes 230, the auxiliary via hole 274 is disposed next to a location 271' corresponding to the first via hole 271 for the $p^{th}$ touch electrode. In this way, the via holes on the touch electrodes 230 can be distributed evenly. Preferably, on each of the first to the $(p-1)^{th}$ touch electrodes 230, the location 271' corresponding to the first via hole 271 for the $p^{th}$ touch electrode and the auxiliary via hole 274 disposed next to the location 271' form a line perpendicular to a direction of the touch lines. In this way, the via holes on the touch electrodes 230 can be distributed further more evenly.

Also referring to the first column of touch electrodes shown in FIG. 2B for an example. The disposition of the auxiliary via holes 274 will be described in detail.

For a touch line 250A, since it is provided with via holes (including the first via hole 271A and the second via holes 272A) on each of the touch electrodes in the column, it is not necessary to provide auxiliary via holes for the touch line 250A.

For a touch line 250B, since it has no via hole on the first touch electrode 231 of the column, an auxiliary via hole 274A is provided on the first touch electrode 231 such that an auxiliary line 260A (positioned between the touch line 250A and the touch line 250B) next to the touch line 250B can be connected to the first touch electrode 231. Preferably, the auxiliary via hole 274A provided on the first touch electrode 231 is disposed next to a location 271B' on the first touch electrode 231 which corresponds to the first via hole 271B provided for the second touch electrode 232. Preferably, the location 271B' and the auxiliary via hole 274A provided on the first touch electrode 231 form a line perpendicular to a direction Z of the touch lines.

For a touch line 250C, since it has no via hole on the first touch electrode 231 and the second touch electrode 232 in the column, auxiliary via holes 274B are provided respectively on the first touch electrode 231 and the second touch electrode 232, such that an auxiliary line 260B (positioned between the touch line 250B and the touch line 250C) next to the touch line 250C can be connected to the first touch electrode 231 and the second touch electrode 232. Preferably, the auxiliary via hole 274B provided on the first touch electrode 231 is disposed next to a location 271C' on the first touch electrode 231 which corresponds to the first via hole 271C provided for the third touch electrode 233. Preferably, the location 271C' and the auxiliary via hole 274B provided on the first touch electrode 231 form a line perpendicular to the direction Z of the touch lines. The auxiliary via hole 274B provided on the second touch electrode 232 is similarly disposed.

For a touch line 250D, since it has no via hole on the first touch electrode 231 to the third touch electrode 233 in the column, auxiliary via holes 274C are provided respectively on the first touch electrode 231 to the third touch electrode 233, such that an auxiliary line 260C (positioned between the touch line 250C and the touch line 250D) next to the touch line 250D can be connected to the first touch electrode 231 to the third touch electrode 233. Preferably, the auxiliary via hole 274C provided on the first touch electrode 231 is disposed next to a location 271D' on the first touch electrode 231 which corresponds to the first via hole 271D provided for the fourth touch electrode 234. Preferably, the location 271D' and the auxiliary via hole 274C provided on the first touch electrode 231 form a line perpendicular to the direction Z of the touch lines. The auxiliary via holes 274C provided on the second touch electrode 232 and the third touch electrode 233 are similarly disposed.

In the present disclosure, by providing the above auxiliary via holes 274, the difference in the number of via holes among the regions of the touch electrodes 230 can be reduced, and the unevenness of the via holes on the touch electrodes 230 can be solved.

Specifically, since FIGS. 2A and 2B are merely illustration of the principle of the present disclosure, each touch line 250 and the corresponding touch electrode 230 are connected through one via hole, and in each column of touch electrodes, only one touch line 250 is shown as corresponding to one touch electrode 230. However, in practical application, each line (including the touch line 250 and the auxiliary line 260) is connected to the corresponding touch electrode 230 through a plurality of via holes, and in each column of touch electrodes, a plurality of touch lines 250 can correspond to one touch electrode 230.

Hereinafter, the specific structure of the array substrate of the present disclosure will be described with reference to FIGS. 3 and 4. An array substrate 300 includes a glass substrate 310, a plurality of gate electrode lines, a plurality of data lines, a plurality of pixel units (not shown) surrounded by the gate electrode lines and the data lines and a touch electrode 320 on the glass substrate 310. The touch electrode 320 covers a plurality of pixel units. A pixel unit includes a thin film transistor 330 and a pixel electrode 340. The thin film transistor 330 has a gate 331 connected to a gate electrode line, a source 332 connected to a data line and a drain 333 connected to the pixel electrode 340.

Figure 3:
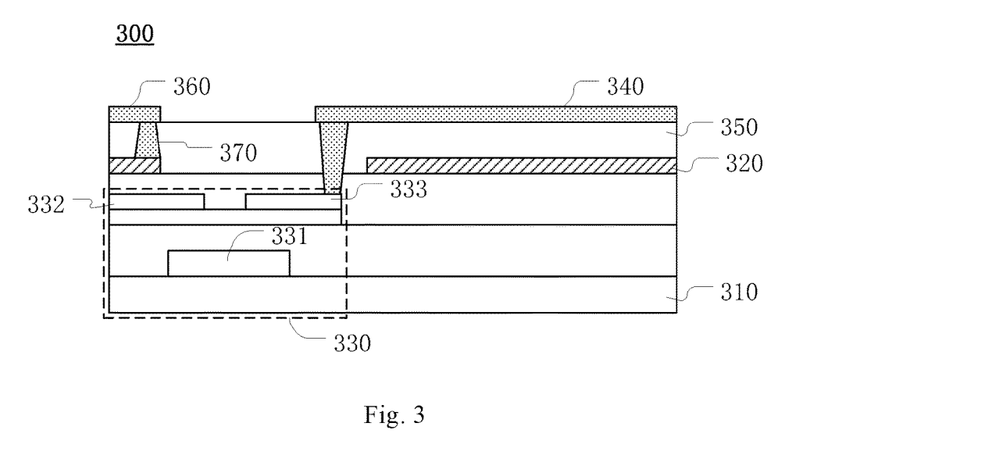
FIG. 3 is a cross sectional view of an array substrate according to an embodiment of the present disclosure.

In the array substrate shown in FIG. 3, a common electrode layer where the touch electrode 320 is disposed is positioned between the thin film transistor 320 and the pixel electrode 340, and an insulating layer 250 is disposed between the common electrode layer where the touch electrode 320 is disposed and the pixel electrode 340.

Figure 4:
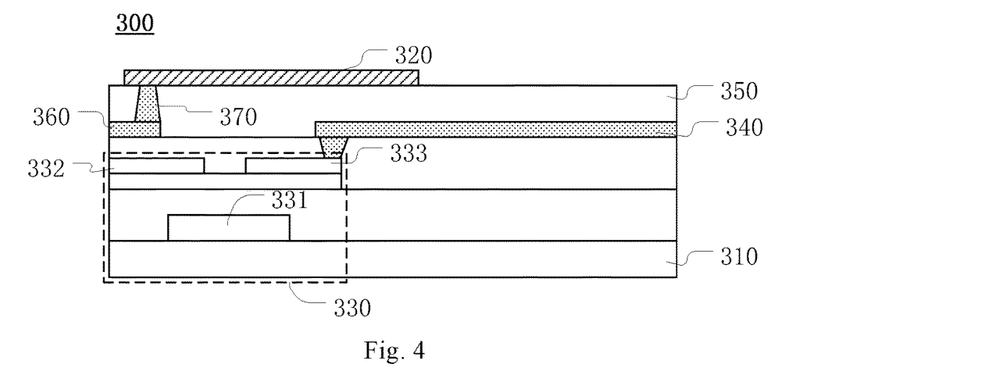
FIG. 4 is a cross sectional view of an array substrate according to another embodiment of the present disclosure.

In another embodiment, as shown in FIG. 4, the pixel electrode 340 is positioned between the thin film transistor 330 and the common electrode layer where the touch electrode 320 is disposed, and the insulating layer 250 is disposed between the common electrode layer where the touch electrode 320 is disposed and the pixel electrode 340.

As shown in FIGS. 3 and 4, a line 360 (a touch line or an auxiliary line) is electrically connected to the touch electrode 320 through a via hole 370. Optionally, the line 360 and the pixel electrode 340 are disposed in the same layer.

Hereinafter, embodiments of positional relationship of touch lines and auxiliary lines and arrangement of via holes will be described with reference to FIGS. 5-7.

First Embodiment

Figure 5:
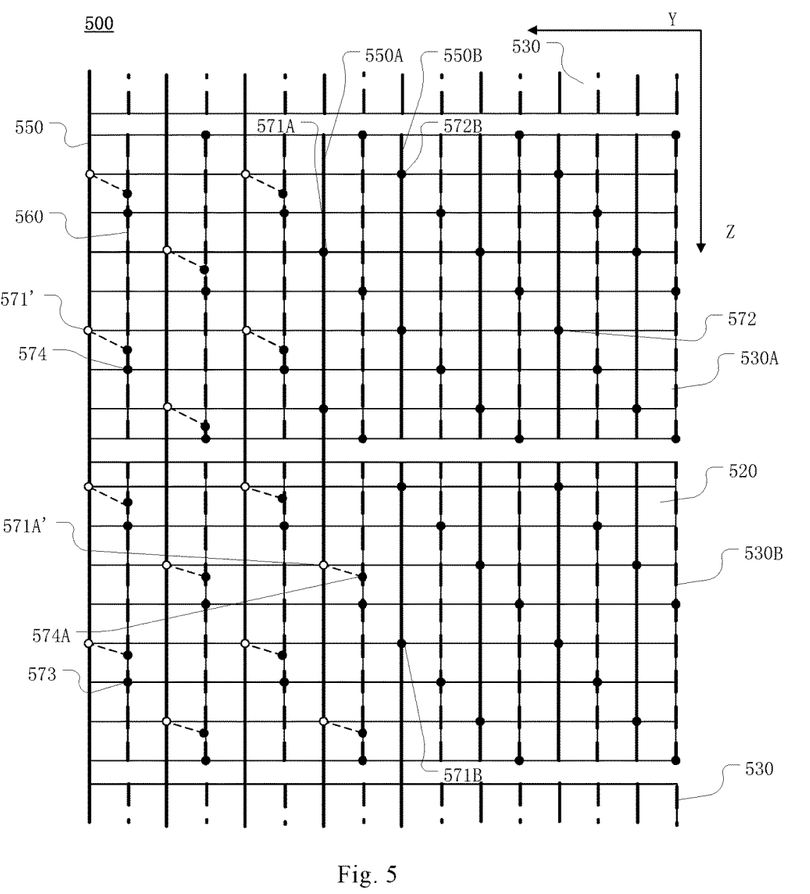
FIG. 5 is a partial schematic diagram of an array substrate according to a first embodiment of the present disclosure.

FIG. 5 only shows a partial view of an array substrate 500. FIG. 5 shows touch electrodes 530A and 530B, and also shows 8 touch lines 550, each of the touch lines 550 corresponds to one touch electrode 530. In other words, the array substrate 500 has 8 touch electrodes 530 in the same column with the touch electrodes 530A and 530B, and the touch electrodes 530A and 530B are respectively the fourth and fifth touch electrodes of the 8 touch electrodes 530. Although in FIG. 5, each touch line 550 corresponds to one touch electrode 530, however, in practical application, it is possible that a plurality of touch lines 550 correspond to one touch electrode 530. In FIG. 5, a touch line 550A is connected to and corresponds to the touch electrode 530A through a first via hole 571A, a touch line 550B is connected to and corresponds to the touch electrode 530B through a first via hole 571B, and connected to the touch electrode 530A through the second via hole 572B.

As shown in FIG. 5, three touch lines 550 positioned at a left side of the touch line 550A, pass through a touch electrode 530 above the touch electrode 530A to a touch electrode 530 below the touch electrode 530B, and have no via holes provided on the touch electrode 530A and the touch electrode 530B. In FIG. 5, the touch line 550A is broken between the touch electrode 530 above the touch electrode 530A and the touch electrode 530A, and passes through the touch electrode 530A to the touch electrode 530 below the touch electrode 530B. In FIG. 5, the touch line 550B is broken between the touch electrode 530 above the touch electrode 530A and the touch electrode 530A and between the touch electrode 530A and the touch electrode 530B, and passes through the touch electrode 530B to the touch electrode 530 below the touch electrode 530B. Three touch lines 550 at a right side of the touch line 550B in FIG. 5 are respectively broken between corresponding touch electrodes, and are connected to the touch electrode 530A and the touch electrode 530B through second via holes 572.

The auxiliary lines 560 and the touch lines 550 of the array substrate 500 are disposed alternatively. In the present embodiment, alternative disposition means that one auxiliary line 560 is disposed between two adjacent touch lines 550, and one touch line 550 is disposed between two adjacent auxiliary lines 560.

In other embodiments, alternative disposition can also mean every two auxiliary lines 560 are disposed as spaced apart by one, two or three touch lines 550. In addition, the number of the auxiliary lines 560 between every two adjacent touch lines 550 can also be one, two or three.

In the present embodiment, every two auxiliary lines 560 can be disposed as spaced apart by one touch line 550, and one auxiliary line 560 is disposed between two adjacent touch lines 550. In other words, in the present embodiment, the touch lines 550 and the auxiliary lines 560 are disposed alternatively one by one. Specifically, the alternative disposition of the touch lines 550 and the auxiliary lines 560 can be devised depending on the size and production cost of the array substrate. For example, for a larger array substrate, the number of the auxiliary lines 560 between adjacent touch lines 550 can be increased. For another example, in order to save production cost of the array substrate, the number of the auxiliary lines 560 between adjacent touch lines 550 can be reduced or the number of touch lines 550 spaced can be increased.

In the prior art, one pixel unit 140 is interposed between two adjacent via holes 130 (as shown in FIG. 1), and this will further affect the display effect. In order to reduce the number of via holes on the touch electrodes 530, in the array substrate 500 as shown in FIG. 5, the locations of the first via holes (such as 571A and 571B), the second via holes 572 and the third via holes 573 (all the via holes shown in black dots except the auxiliary via holes 574 (including the auxiliary via holes 574A)) are arranged in an array form. In the array form, two adjacent via holes along the direction Z of the touch lines are spaced apart by a number N of pixel units 520; and/or two adjacent via holes along a direction (such as a direction Y) perpendicular to the direction of the touch lines are spaced apart by a number M of pixel units 520. N is an integer larger than 1 and smaller than or equal to 8, and M is an integer larger than 1 and smaller than or equal to 8. Preferably, N and M are assigned with the same value. Specifically, the value of M or N can be selected depending on the size and the production speed of the array substrate. For example, for a larger array substrate, M and N can be assigned with larger values. For another example, in order to save production time of the array substrate, M and N can be assigned with smaller values. Preferably, via holes on two adjacent lines are arranged as staggered.

Specifically, in the present embodiment, two adjacent via holes along the direction Z of the touch lines are spaced apart by 4 pixel units 520, and two adjacent via holes along the direction (i.e. the direction Y) perpendicular to the direction of the touch lines are spaced apart by 4 pixel units 520, to reduce the density of the via holes on the touch electrodes 530 (to ¼ of the density of the via holes in FIG. 1). Moreover, via holes on two adjacent lines are arranged as staggered by one pixel unit 520, further making the via holes on the touch electrodes 530 distributed evenly. According to the arrangement of the present embodiment, each touch line 550 is connected to the touch electrode 530 through two via holes.

In addition, an auxiliary via hole 574 is disposed next to a location 571' corresponding to a first via hole. For example, an auxiliary via hole 574A is disposed next to a location 571A' corresponding to the first via hole 571A. The location of the first via hole 571A on the touch electrode 530A corresponds to the location 571A' on the touch electrode 530B. In the present embodiment, the auxiliary via hole 574 and the location 571' form a line that is not perpendicular to the direction Z of the touch lines. Since it is not required a precise perpendicular arrangement, the production process of the auxiliary via hole 574 can be simplified.

Second Embodiment

Figure 6:
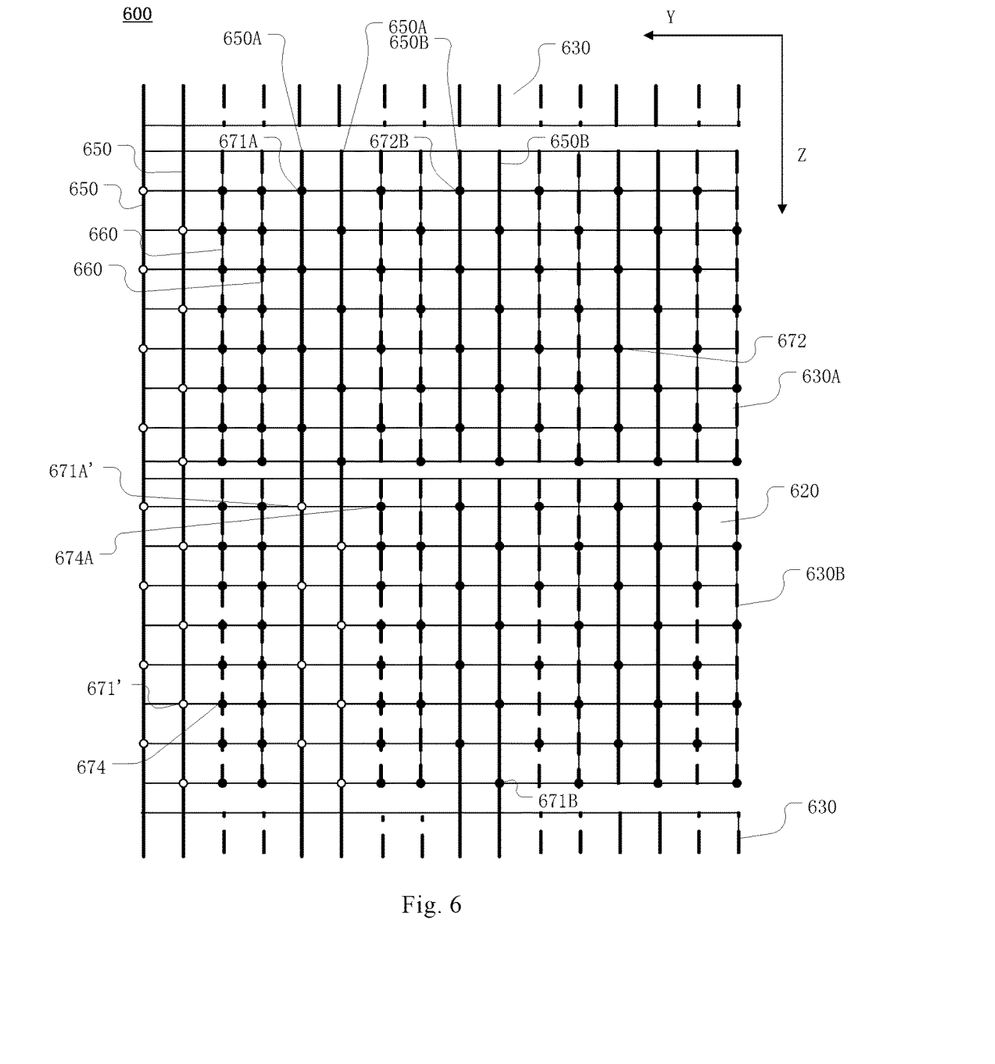
FIG. 6 is a partial schematic diagram of an array substrate according to a second embodiment of the present disclosure.

FIG. 6 shows a partial view of an array substrate 600. FIG. 6 shows touch electrodes 630A and 630B, and also shows 8 touch lines 650, every two of the touch lines 650 corresponds to one touch electrode 630. In other words, the array substrate 600 has 4 touch electrodes 630 in the same column with the touch electrodes 630A and 630B, and the touch electrodes 630A and 630B are respectively the second and third touch electrodes of the 4 touch electrodes 630. In FIG. 6, two touch lines 650A are connected to and correspond to the touch electrode 630A through first via holes 671A, and two touch lines 650B are connected to and correspond to the touch electrode 630B through first via holes 671B, and are connected to the touch electrode 630A through second via holes 672B.

As shown in FIG. 6, two touch lines 650 positioned at a left side of the touch lines 650A, pass through a touch electrode 630 above the touch electrode 630A to a touch electrode 630 below the touch electrode 630B, and have no via holes provided on the touch electrode 630A and the touch electrode 630B. In FIG. 6, the two touch lines 650A are broken between the touch electrode 630 above the touch electrode 630A and the touch electrode 630A, and pass through the touch electrode 630A to the touch electrode 630 below the touch electrode 630B. In FIG. 6, the two touch lines 650B are broken between the touch electrode 630 above the touch electrode 630A and the touch electrode 630A and between the touch electrode 630A and the touch electrode 630B, and pass through the touch electrode 630B to the touch electrode 630 below the touch electrode 630B. Two touch lines 650 at a right side of the touch lines 650B in FIG. 6 are respectively broken between corresponding touch electrodes, and are connected to the touch electrode 630A and the touch electrode 630B through second via holes 672.

In the present embodiment, two auxiliary lines 660 can be disposed as spaced apart by two touch lines 650. In other words, in the present embodiment, two touch lines 650 and two auxiliary lines 660 are repeatedly disposed in such manner.

Specifically, in the present embodiment, along the direction Z of the touch lines, two adjacent via holes (all the via holes shown in black dots except the auxiliary via holes 674 (including the auxiliary via holes 674A)) are spaced apart by 2 pixel units 620, and along the direction perpendicular to the direction of the touch lines (i.e. the direction Y), two adjacent via holes are spaced apart by 2 pixel units 620, to reduce the density of via holes on the touch electrodes. In addition, via holes on two adjacent lines are arranged as staggered by one pixel unit 620, making the via holes on the touch electrodes further evenly distributed. The embodiment of FIG. 6 has a via hole density amounting to ½ of the via hole density in FIG. 1. Through this arrangement, in addition to evenly distributing the via holes, the via hole density can also be reduced. In the arrangement of the present embodiment, each touch line 650 is connected to a touch electrode 630 through four via holes.

In addition, an auxiliary via hole 674 is disposed next to a location 671' corresponding to a first via hole. For example, an auxiliary via hole 674A is disposed next to a location 671A' corresponding to the first via hole 671A. The location of the first via hole 671A on the touch electrode 630A corresponds to the location 671A' on the touch electrode 630B. Moreover, in the present embodiment, the auxiliary via hole 674 and the location 671' form a line that is perpendicular to the direction Z of the touch lines, making the via holes on the touch electrodes further evenly distributed. In addition, in the present embodiment, since every two auxiliary lines are spaced apart by two touch lines 650, the auxiliary via holes 674 are respectively disposed on the two auxiliary lines 660 at two sides of the two touch lines 650. In some modified embodiments, the auxiliary via holes 674 can also be disposed on one of the two auxiliary lines 660 at one side of the two touch lines 650. Thus, by disposing auxiliary via holes 674, a problem of uneven distribution of via holes due to the fact that no via holes are disposed at the locations 671' can be solved. In addition, since the auxiliary via holes 674 are disposed respectively next to the locations 671', the auxiliary via holes 674 and other via holes can be distributed substantially evenly on the touch electrodes 630.

Third Embodiment

Figure 7:
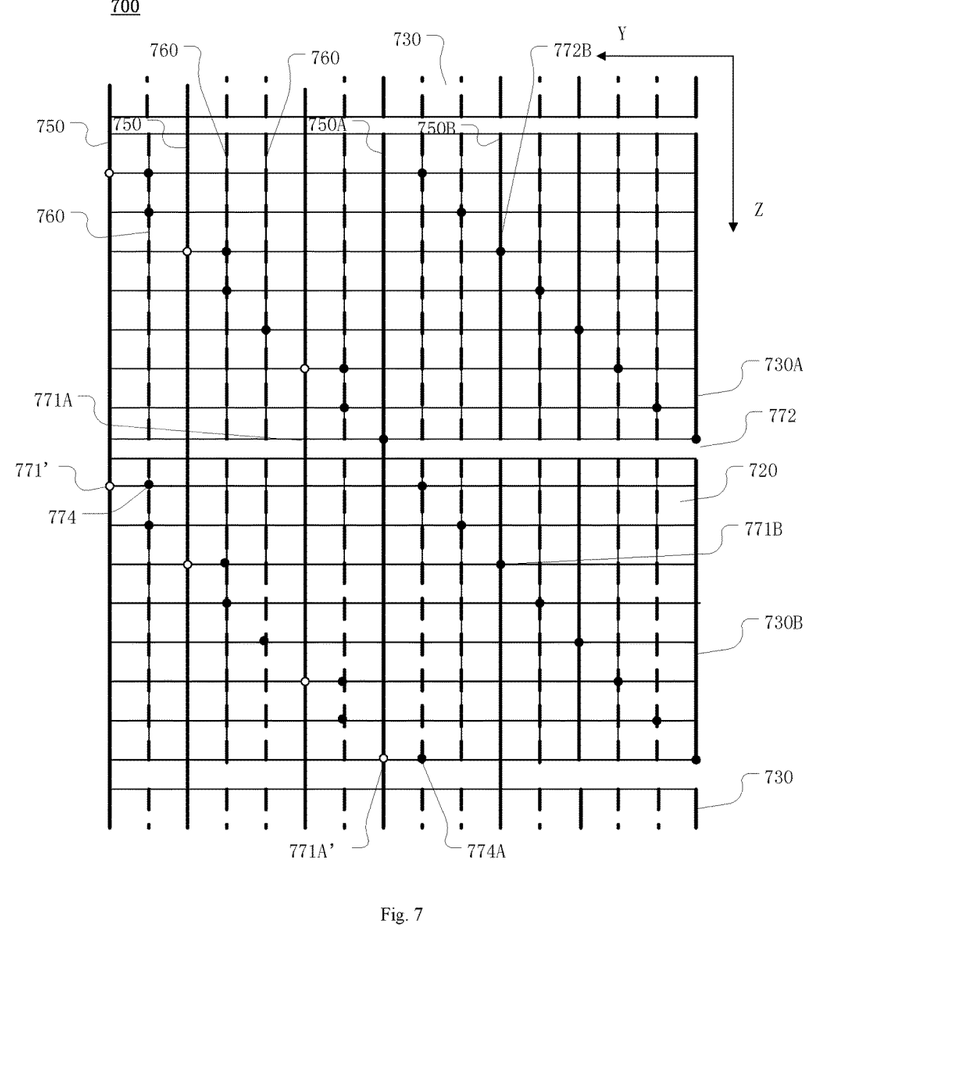
FIG. 7 is a partial schematic diagram of an array substrate according to a third embodiment of the present disclosure.

FIG. 7 shows a partial view of an array substrate 700. FIG. 7 shows touch electrodes 730A and 730B, and also shows 8 touch lines 750, each of the touch lines 750 corresponds to one touch electrode 730. In other words, the array substrate 700 has 8 touch electrodes 730 in the same column with the touch electrodes 730A and 730B, and the touch electrodes 730A and 730B are respectively the fourth and fifth touch electrodes of the 8 touch electrodes 730. In FIG. 7, a touch line 750A is connected to and corresponds to the touch electrode 730A through a first via hole 771A, a touch line 750B is connected to and corresponds to the touch electrode 730B through a first via hole 771B, and is connected to the to touch electrode 730A through a second via hole 772B.

As shown in FIG. 7, three touch lines 750 positioned at a left side of the touch line 750A, pass through a touch electrode 730 above the touch electrode 730A to a touch electrode 730 below the touch electrode 730B, and have no via holes provided on the touch electrode 730A and the touch electrode 730B. In FIG. 7, the touch line 750A is broken between the touch electrode 730 above the touch electrode 730A and the touch electrode 730A, and passes through the touch electrode 730A to the touch electrode 730 below the touch electrode 730B. In FIG. 7, the touch line 750B is broken between the touch electrode 730 above the touch electrode 730A and the touch electrode 730A and between the touch electrode 730A and the touch electrode 730B, and passes through the touch electrode 730B to the touch electrode 730 below the touch electrode 730B. Two touch lines 750 at a right side of the touch line 750B in FIG. 7 are respectively broken between corresponding touch electrodes, and are connected to the touch electrode 730A and the touch electrode 730B through second via holes 772.

In the present embodiment, every two adjacent touch lines 750 can be disposed as spaced apart by one or two auxiliary lines 760. In other words, in the present embodiment, one touch line 750, two auxiliary lines 760, one touch line 750 and one auxiliary line 760 are repeatedly disposed in such manner.

Specifically, in the present embodiment, along the direction Z of the touch lines, two adjacent via holes (all the via holes shown in black dots except the auxiliary via holes 774) are spaced apart by 8 pixel units 720, and along the direction perpendicular to the direction of the touch lines (i.e. the direction Y), two adjacent via holes are spaced apart by 8 pixel units 720, to reduce the density of via holes on the touch electrodes. In addition, via holes on two adjacent lines are arranged as staggered by one pixel unit 720, making the via holes on the touch electrodes further evenly distributed. The embodiment of FIG. 7 has a via hole density amounting to ⅛ of the via hole density in FIG. 1. In the arrangement of the present embodiment, each touch line 750 is connected to a touch electrode 730 through one via hole.

In addition, an auxiliary via hole 774 is disposed next to a location 771' corresponding to a first via hole. For example, an auxiliary via hole 774A is disposed next to a location 771A' corresponding to the first via hole 771A. The location of the first via hole 771A on the touch electrode 730A corresponds to the location 771A' on the touch electrode 730B. In the present embodiment, the auxiliary via hole 774A is disposed on an auxiliary line 760 which is closest to the touch line 750 where the location 771' is located. Thus, by disposing auxiliary via holes 774, a problem of uneven distribution of via holes due to the fact that no via holes are disposed at the locations 771' can be solved. In addition, since the auxiliary via holes 774 are disposed respectively next to the locations 771', the auxiliary via holes 774 and other via holes can be distributed substantially evenly on the touch electrodes 730.

FIGS. 5-7 merely show three exemplary embodiments of the present disclosure. Other examples that can be devised by those skilled in the art based on the disclosure herein are contemplated. For example, N and M can be assigned other values, and the positional relationship between the touch lines and the auxiliary lines can be modified. All these modifications fall within the protective scope of the present disclosure.

According to another aspect of the present disclosure, there is provided a touch display panel including the array substrate described above.

According to another aspect of the present disclosure, there is provided a touch display device including the touch display panel described above. The touch display device of the present disclosure can have excellent display effect since it solves the problem of uneven via holes.

Compared with the prior art, the present disclosure can solve the problem of visible mura in displayed images, and have the following advantages.

1) By providing auxiliary lines, and for each touch control line, providing auxiliary via holes of auxiliary lines next to the touch control line on touch electrodes on which the touch lines have no first via holes or second via holes, the difference in numbers of via holes among the different regions of the touch electrodes can be reduced, and the problem of uneven via holes on the touch electrodes can be solved.

2) By spacing apart the first via holes, the second via holes and the third via holes with more than one pixel units, the number of via holes on the array substrate can be reduced.

3) By evenly distributing the locations of the first via holes, the second via holes and the third via holes, and disposing the locations of the auxiliary via holes based on the locations of the first via holes on the touch electrodes, the via holes on the touch electrodes can be distributed substantially evenly.

The exemplary embodiments of the present disclosure have been illustrated and described in the above. It should be understood that the present disclosure is not limited to the embodiments described herein. On the contrary, it is intended that various modifications and equivalent substitutions within the scope of the claims appended should be covered by the present disclosure.

What is claimed is:

1. An array substrate comprising:
    a substrate;
    a plurality of pixel units disposed on the substrate;
    columns of touch electrodes, each column of touch electrodes comprising an X number of touch electrodes, and each touch electrode covering a plurality of pixel units;
    a driving circuit for driving the touch electrodes;
    touch lines for connecting a corresponding touch electrode to the driving circuit through a first via hole; and
    at least one auxiliary line positioned between two adjacent touch lines, each auxiliary line being connected through a third via hole to a touch electrode at the third via hole and broken between adjacent touch electrodes,
    wherein for each column of touch electrodes:
    when a touch line passes through a first touch electrode to a pth touch electrode and corresponds to the pth touch electrode,
    the touch line is broken into segments between any two adjacent touch electrodes of the pth touch electrode to the Xth touch electrode, and the touch line is provided with second via holes respectively on the (p+1)th touch electrode to the Xth touch electrode, such that each segment of touch line is connected through a second via hole to a touch electrode at the second via hole; and, wherein for each column of touch electrodes, auxiliary via holes are disposed respectively on the first touch electrode to the (p−1)th touch electrode, such that an auxiliary line next to a touch line corresponding to a pth touch electrode is connected through an auxiliary via hole to a touch electrode at the auxiliary via hole, and the auxiliary via holes are not disposed on the pth electrode to a last electrode of the column, wherein X is an integer larger than or equal to 2, and when X is larger than 2, p is an integer between 2 and (X−1).

2. The array substrate of claim 1, wherein for each column of touch electrodes, for the touch line corresponding to the first touch electrode, the touch line is broken into segments between any two adjacent touch electrodes of the first touch electrode to the Xth touch electrode, and is provided with second via holes respectively on the second touch electrode to the Xth touch electrode, such that each segment of the touch line is connected through a second via hole to a touch electrode at the second via hole; and for the touch line corresponding to the Xth touch electrode, the touch line passes through the whole column of touch electrodes, and auxiliary via holes are provided respectively on the first touch electrode to the (X−1)th touch electrode, such that an auxiliary line next to a touch line corresponding to the Xth touch electrode is connected through an auxiliary via hole to a touch electrode at the auxiliary via hole.

3. The array substrate of claim 1, wherein for each column of touch electrodes, disposing auxiliary via holes respectively on the first touch electrode to the (p−1)th touch electrode comprises:

on each of the first touch electrode to the (p−1)th touch electrode, an auxiliary via hole is disposed next to a location corresponding to a first via hole for a pth touch electrode.

4. The array substrate of claim 3, wherein on each of the first touch electrode to the (p−1)th touch electrode, the location corresponding to the first via hole for the pth touch electrode and the auxiliary via hole disposed next to the location form a line perpendicular to a direction of the touch lines.

5. The array substrate of claim 1, wherein the first via holes, the second via holes and the third via holes are arranged in a form of a first array, the form of the first array is:

two adjacent via holes along the direction of the touch lines are spaced apart by a number N of pixel units; and/or two adjacent via holes along a direction perpendicular to the direction of the touch lines are spaced apart by a number M of pixel units.

6. The array substrate of claim 5, wherein N is an integer larger than 1 and less than or equal to 8, and M is an integer larger than 1 and less than or equal to 8.

7. The array substrate of claim 5, wherein via holes on two adjacent lines are arranged as staggered, the lines comprising the touch lines and the auxiliary lines.

8. The array substrate of claim 4, wherein the via holes on the touch electrodes are distributed evenly.

9. The array substrate of claim 1, wherein the auxiliary lines and the touch lines are alternatively disposed.

10. The array substrate of claim 9, wherein being alternatively disposed means that two auxiliary lines are spaced apart by one touch line.

11. The array substrate of claim 9, wherein two touch lines are spaced apart by one auxiliary line.

12. The array substrate of claim 9, wherein the auxiliary lines and the touch lines are disposed in parallel.

13. The array substrate of claim 1, wherein the columns of touch electrodes are reused as common electrodes.

14. The array substrate of claim 1, wherein the array substrate further comprises a pixel electrode layer, and the touch lines and the pixel electrode layer are disposed at the same layer.

15. The array substrate of claim 14, wherein the pixel electrode layer is positioned between a layer of the common electrodes and the substrate; or the layer of the common electrodes is positioned between the pixel electrode layer and the substrate.

16. A touch display panel comprising:

an array substrate comprising:

a substrate;

a plurality of pixel units disposed on the substrate;

columns of touch electrodes, each column of touch electrodes comprising an X number of touch electrodes, and each touch electrode covering a plurality of pixel units;

a driving circuit for driving the touch electrodes;

touch lines for connecting a corresponding touch electrode to the driving circuit through a first via hole; and at least one auxiliary line positioned between two adjacent touch lines, each auxiliary line being connected through a third via hole to a touch electrode at the third via hole and broken between adjacent touch electrodes, wherein for each column of touch electrodes:

when a touch line passes through a first touch electrode to a pth touch electrode and corresponds to the pth touch electrode, the touch line is broken into segments between any two adjacent touch electrodes of the pth touch electrode to the Xth touch electrode, and the touch line is provided with second via holes respectively on the (p+1)th touch electrode to the Xth touch electrode, such that each segment of touch line is connected through a second via hole to a touch electrode at the second via hole; and, wherein for each column of touch electrodes, auxiliary via holes are disposed respectively on the first touch electrode to the (p−1)th touch electrode, such that an auxiliary line next to a touch line corresponding to a pth touch electrode is connected through an auxiliary via hole to a touch electrode at the auxiliary via hole, and the auxiliary via holes are not disposed on the pth electrode to a last electrode of the column, wherein X is an integer larger than or equal to 2, and when X is larger than 2, p is an integer between 2 and (X−1).

17. A touch display device comprising:

a touch display panel comprising:

an array substrate comprising:

a substrate;

a plurality of pixel units disposed on the substrate;

columns of touch electrodes, each column of touch electrodes comprising an X number of touch electrodes, and each touch electrode covering a plurality of pixel units;

a driving circuit for driving the touch electrodes;

touch lines for connecting a corresponding touch electrode to the driving circuit through a first via hole; and at least one auxiliary line positioned between two adjacent touch lines, each auxiliary line being connected through a third via hole to a touch electrode at the third via hole and broken between adjacent touch electrodes, wherein for each column of touch electrodes:

when a touch line passes through a first touch electrode to a pth touch electrode and corresponds to the pth touch electrode, the touch line is broken into segments between any two adjacent touch electrodes of the pth touch electrode to the Xth touch electrode, and the touch line is provided with second via holes respectively on the (p+1)th touch electrode to the Xth touch electrode, such that each segment of touch line is connected through a second via hole to a touch electrode at the second via hole; and, wherein for each column of touch electrodes, auxiliary via holes are disposed respectively on the first touch electrode to the (p−1)th touch electrode, such that an auxiliary line next to a touch line corresponding to a pth touch electrode is connected through an auxiliary via hole to a touch electrode at the auxiliary via hole, and the auxiliary via holes are not disposed on the pth electrode to a last electrode of the column, wherein X is an integer larger than or equal to 2, and when X is larger than 2, p is an integer between 2 and (X−1).

* * * * *